3 Sheets—Sheet 1.

F. BRAMER.

MOWING-MACHINE.

No. 7,540. Reissued Feb. 27, 1877.

WITNESSES

Clarence Poole

Wm A. Skinkle

INVENTOR

Frank Bramer.

By his Attorneys

Baldwin, Hopkins & Peyton

3 Sheets—Sheet 2.
F. BRAMER.
MOWING-MACHINE.
No. 7,540. Reissued Feb. 27, 1877.
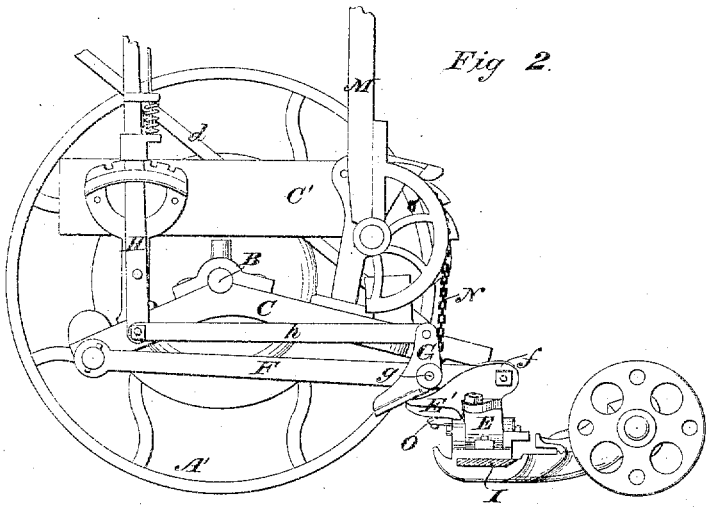
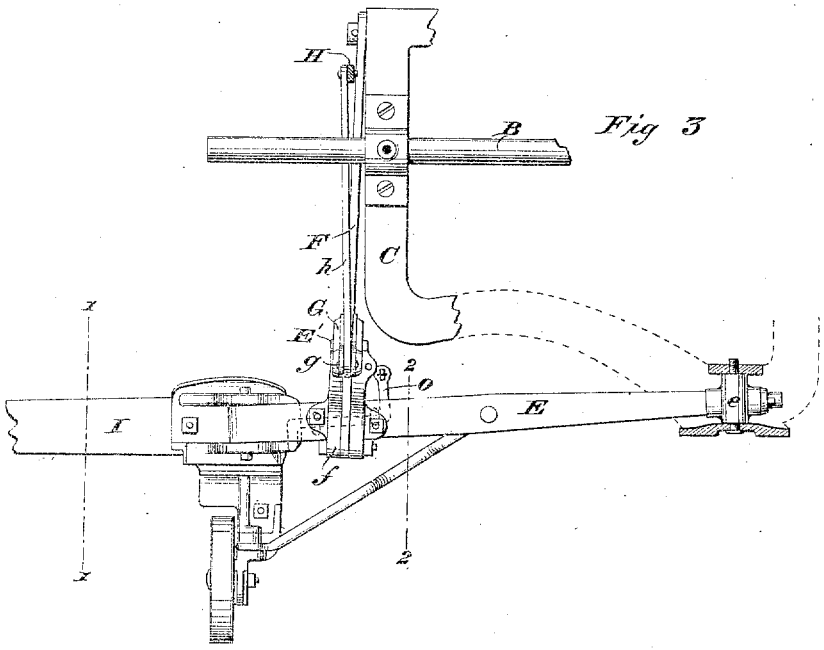
WITNESSES
C. Clarence Poole
Wm A. Skinkle.
INVENTOR
Frank Bramer.
By his Attorneys,
Baldwin, Hopkins & Peyton

F. BRAMER.

MOWING-MACHINE.

No. 7,540. Reissued Feb. 27, 1877.

WITNESSES

C. Clarence Poole

Wm. A. Skinkle

INVENTOR

Frank Bramer.

By his Attorneys

Baldwin, Hopkins & Peyton.

UNITED STATES PATENT OFFICE.

FRANK BRAMER, OF LITTLE FALLS, NEW YORK.

IMPROVEMENT IN MOWING-MACHINES.

Specification forming part of Letters Patent No. 156,760, dated November 10, 1874; reissue No. 7,540, dated February 27, 1877; application filed January 18, 1877.

*To all whom it may concern:*

Be it known that I, FRANK BRAMER, of Little Falls, in the county of Herkimer and State of New York, have invented certain new and useful Improvements in Harvesting-Machines, of which the following is a specification:

My invention relates to the well-known class of two-wheeled front-cut hinge-bar mowing-machines having rocking folding finger-beams—such, for instance, as that shown in Letters Patent of the United States No. 51,546, granted to me December 19, 1865.

The object of the first part of my invention is to regulate the rocking or rolling of the finger-beam upon its longitudinal axis; to which end this part of my invention consists of a simple device, by which the finger bar, or the points of the guards, may be turned up and maintained in such position as that, in passing stones, hummocks, or other obstructions, the cutting apparatus will glide over them uninjured without attention on the part of the operator, while at the same time leaving the cutting apparatus free to move in any direction required under the usual working conditions, thus constituting a valuable improvement for use upon rough land.

My invention further consists of an improvement in the track-clearer, by which its dividing stick or finger may be rolled in its shoe, so as to raise or lower its outer end at will, to adapt it to different conditions of the crop.

The subject-matter claimed will hereinafter specifically be designated.

The accompanying drawings represent so much of a mowing-machine embracing my improvements as is necessary to illustrate the subject-matter herein claimed.

Figure 1:
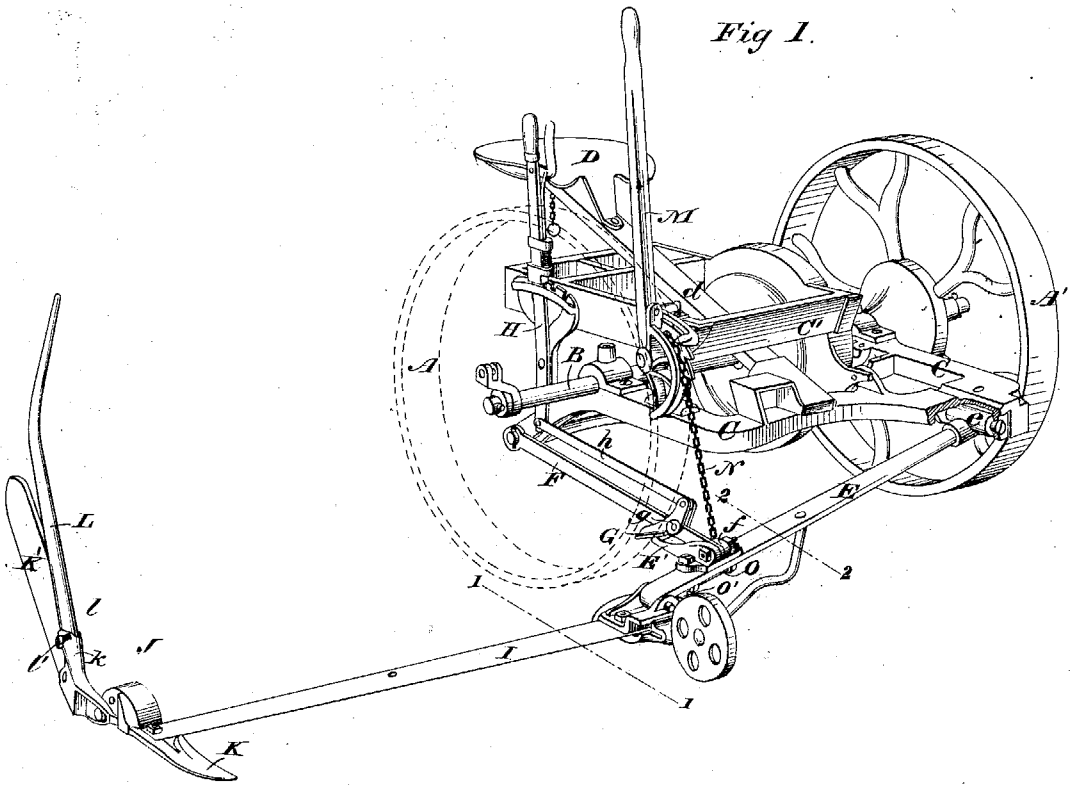
Figure 4:
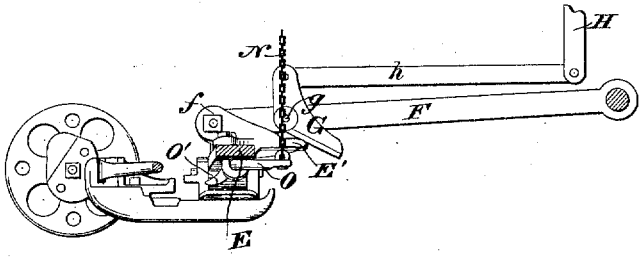
Figure 5:
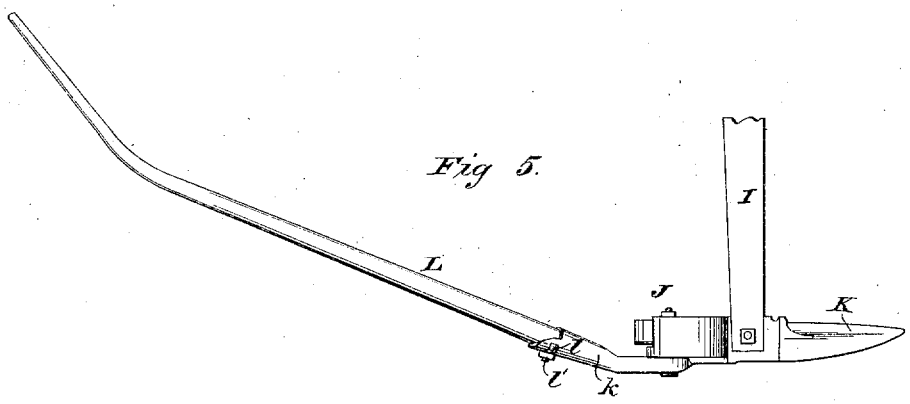
Figure 6:
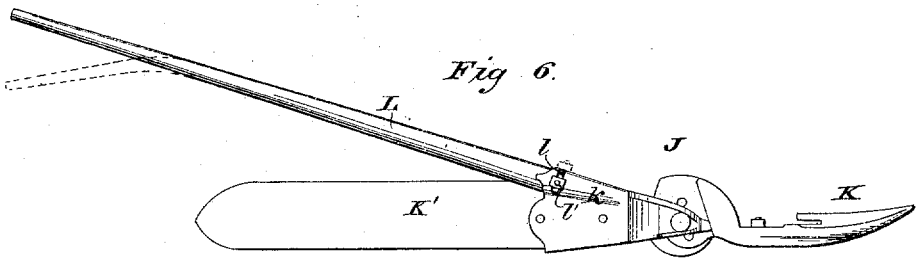

Figure 1 represents a view in perspective thereof, with the inner driving-wheel removed to show the parts which would otherwise be concealed by it. Fig. 2 represents a view in elevation of the machine, as seen from the divider side, with the inner driving-wheel removed, and with the cutting apparatus in section on the line 1 1 of Figs. 1 and 3. Fig. 3 represents a plan or top view of the flexible connections between the main frame and cutting apparatus. Fig. 4 represents a view in elevation of portions of the flexible connections, partly in section on the line 2 2 of Figs. 1 and 3, showing particularly the details of the gag-iron or locking-stop. Fig. 5 represents a plan view of the divider end of the cutting apparatus; and Fig. 6 a side elevation thereof.

Two main driving and supporting wheels, A A′, are mounted upon an axle, B, in well-known ways, the axle revolving in boxes in a cast-metal main frame, C, having a drooping rear end. A bar or standard, *d*, inclined backward and upward from this frame, supports a seat, D, for the driver behind the axle. This standard passes through an upper platform or supplementary frame, C′, mounted upon the lower frame C, partaking of its movement. A coupling-arm, E, is hinged at its upper end to a rocking bearing, *e*, in the outer front corner of the frame, in which bearing the coupling, arm swivels. The lower end of the coupling-arm is hinged to the shoe, as usual. A thrust-bar, F, is pivoted in rear to the main frame, while its front end is pivoted on a lug, *f*, on the coupling-arm. A wedge-shaped block, E′, is fixed upon, and extends back of, the coupling-arm, and is acted upon by a rocking cam or wiper, G, rocking upon a pivot, *g*, on the thrust-bar, and connected, by means of a link, *h*, with a hand lever, H, pivoted upon the frame within convenient reach of the driver, and provided with the usual spring-latch and detent, by which means the coupling-arm may be rocked or rolled on its longitudinal axis by the attendant while in his seat.

The guards may thus be held at any desired elevation, while their points are free to rise above that point, and, by moving the hand-lever backward, the downward range of motion of the guard-fingers will be increased; though, under all circumstances, the rocking cam will act as a stop, to prevent too great downward deflection of the points of the guards.

A lifting lever, M, pivoted upon the main frame, provided with the usual detent or holding pawl, is connected by its lifting-chain N with a crank-arm or gag-iron, O, rocking in bearings underneath the coupling-arm and provided with a projecting locking-toe, O′, which comes between the coupling-arm and the heel of the shoe, as shown in Fig. 4, by which mode of construction, when the cutting apparatus is lifted, the heel of the shoe abuts against this locking-stop and causes the finger-bar to lift horizontally without flexing its joint, as it would otherwise do, while at the same time leaving it free to rock and roll or be tilted by the tilting-lever and rocking-cam, as above described.

It will be observed that by my improvement the lifting mechanism is entirely independent of the tilting mechanism, so that I am enabled to rock the cutter-bar either while resting upon the ground or while suspended by the lifting-chain.

A finger-beam, I, is attached to the inner shoe in the ordinary manner, and carries a divider, J, at its outer end, to which a divider-iron, K, is secured, and to which a track-clearer or divider-board, K′, is pivoted, as usual. A socket, *k*, on the upper end of the divider-iron, receives the rounded end of the dividing stick or finger L, which, in combination with the track-board K′, makes the track-clearer, and throws the cut grass away from that which is left standing. The socket *k* is provided with a slot, *l*, in which a screw-bolt, *l′*, inserted in the divider-stick, works. The moving of this bolt in its slot allows the divider-finger to be adjusted at will, as shown by dotted lines in Fig. 6. The rear end of the divider-stick is bent or curved, as shown in Fig. 5. In lodged grass or grain this point, which is ordinarily horizontal, is turned down, allowing the tangled mass of cut grain or grass to slip off the stick, leaving the cut stalks evenly scattered over the ground, and not running them together in heaps, which is done when the stick is high and unadjustable.

In cutting tall standing crops the point of the divider-stick is turned up, keeping the stalks erect and not allowing the cut to become entangled with the uncut stalks, thus making an easily adjusted and efficient track-clearer.

What I claim as my invention, and desire to secure by Letters Patent, is—

1. The combination, substantially as hereinbefore set forth, of a main frame, a rocking-hinged coupling-arm, a thrust-bar connecting the main frame and coupling-arm, a lifting apparatus, a tilting lever, a rocking-cam, and a wedge upon the coupling-arm.

2. The combination, substantially as hereinbefore set forth, of the wedge-block on the rocking coupling-arm with the rocking-cam on the thrust-bar, for tilting or rocking the finger-bar on its longitudinal axis.

3. The combination, substantially as hereinbefore set forth, of the main frame, the rocking coupling-arm, the block or wedge thereon, the push-bar connecting the main frame and coupling-arm, the hand-lever, its link, and the rocking-cam on the thrust-bar.

4. The combination of the rocking coupling-arm, the shoe, the cranked gag-iron or locking-stop, rocking underneath the coupling-arm and acting on the shoe, the lifting-lever, and the chain connecting it with the gag-iron, these members being constructed and operating in combination, substantially as hereinbefore set forth, to allow the guards to rock or roll upward, while the cutting apparatus is elevated above the ground.

5. The divider-iron, constructed as hereinbefore described, with a transversely-slotted socket, in combination with the divider-finger inserted therein, and the screw-bolt passing through the slot into the finger, for permitting said finger to be rolled and secured in any desired position, substantially as and for the purpose hereinbefore set forth.

FRANK BRAMER.

Witnesses:
WM. D. BALDWIN,
WM. J. PEYTON.